United States Patent [19]

Janney

[11] Patent Number: 5,281,146
[45] Date of Patent: Jan. 25, 1994

[54] EDUCATIONAL DEVICE AND METHOD

[76] Inventor: Henry L. Janney, 2301 Scott St. #1, San Francisco, Calif. 94115

[21] Appl. No.: 44,975

[22] Filed: Apr. 8, 1993

[51] Int. Cl.$^5$ .................................................. G09B 3/00
[52] U.S. Cl. .................... 434/348; 434/327; 434/346
[58] Field of Search .............. 434/327, 348, 346, 345, 434/157

[56] References Cited

U.S. PATENT DOCUMENTS

| | | | |
|---|---|---|---|
| 2,222,245 | 11/1940 | Steen | 434/348 |
| 2,687,579 | 8/1954 | Davis | 434/327 |
| 3,097,435 | 7/1963 | Goldschmidt | 434/348 |
| 3,139,689 | 7/1964 | Quintel et al. | 434/327 |
| 3,181,252 | 5/1965 | Goldschmidt et al. | 434/348 |
| 3,206,872 | 9/1965 | Nason et al. | 434/348 |
| 3,230,641 | 1/1966 | Sloves | 434/348 |
| 4,377,383 | 3/1983 | Meyers | 434/348 |
| 4,558,865 | 12/1985 | Isgar | 434/327 X |
| 4,566,698 | 1/1986 | Sneden | 273/249 |
| 4,770,638 | 9/1988 | Jabour et al. | 434/348 |

FOREIGN PATENT DOCUMENTS

| | | | |
|---|---|---|---|
| 712039 | 6/1965 | Canada | 434/327 |

*Primary Examiner*—Gene Mancene
*Assistant Examiner*—L. Thomas
*Attorney, Agent, or Firm*—Raymond B. Cranfill

[57] ABSTRACT

A self-help test book or similar device incorporating quiz cards is disclosed. The test book comprises question display elements, each of which bears printed questions. Each question is identified by an answer identification code having a first graphic designation and a second numeric designation. The test book is also provided with an answer display element, bearing answers to the questions. The answers are arranged in blocks according to the graphic designation of the particular question to which the answer belongs, and are further organized within each block by the numeric designation of that question. The questions are assigned answer identification codes in a non-ordered fashion so that answers to adjacent questions are displaced from one another. Questions and answers thereto are fully and simultaneously visible. According to another embodiment, a quiz card device comprises a stackable plurality of quiz cards bearing a vertical array of question and answer pairs, slidably and removably disposed within a housing. The housing is provided with a window through which the uppermost quiz card can be viewed, and is further provided with a screen that is captured and slidably disposed within said housing immediately behind the window, such that the screen can be manipulated to obstruct the view of all or a portion of the uppermost quiz card. A user then manipulates the position of the screen to sequentially reveal first a question and then an answer, thereby quizzing himself on the material.

4 Claims, 3 Drawing Sheets

FIG. 3

Chapter 1 – card 1

| | |
|---|---|
| face | la visage |
| nose | la nez |
| mouth | la bouche |
| hand | le main |
| finger | la doit |
| goodbye | adieu |
| to cost | coûter |
| to sing | chanter |
| to ask | demander |
| to want | désire |

Chapter 10 – card 1

Chapter 10 – card 1

| | |
|---|---|
| tie | la cravate |
| belt | la ceinture |
| shirt | la chemise |
| pants | la pantalon |
| sock | la chausette |
| cup | la tasse |
| saucer | la soucoupe |
| knife | le couteau |
| fork | la fourchette |
| spoon | la cuiller |

Chapter 1 – card 1

| | |
|---|---|
| face | la visage |
| nose | la nez |
| mouth | la bouche |
| hand | le main |
| finger | la doit |
| goodbye | adieu |
| to cost | coûter |
| to sing | chanter |
| to ask | demander |
| to want | désire |

30
52
34

EDUCATIONAL DEVICE AND METHOD

FIELD OF THE INVENTION

The invention relates generally to educational devices and more particularly to self-help quiz and testing materials.

BACKGROUND OF THE INVENTION

Quiz books and similar self-help testing materials are well known in the educational field. Such materials are designed to allow a student to pursue self-directed studies in a particular subject while at the same time allow the student to gauge his or her progress in mastery of the material being studied.

Perhaps the greatest obstacle to self testing materials is the arrangement of questions and answers so that the answer to a particular question is not discoverable merely by passive inspection, such as when the answer appears with the question. Rather, it is necessary in some way to separate the answer from the question so that the answer is not immediately apparent but also so that undue time is not wasted when the answer is intentionally sought.

Various solutions to arrangement of questions and answers have been proposed, but all suffer limitations. With quiz books, the answers are provided rearward of the question material, such as in an appendix, and are generally presented in the same order as the questions. This approach does prevent answer discovery while a question is being read and considered, but nevertheless suffers from some serious deficiencies. First, because the answers are in the same order as the questions, noticing the answer to the next question is often unavoidable. Thus, the student is forced to answer a block or group of questions before consulting the answers in order to avoid inadvertent discovery of answers if she were to consult the answer column on a question by question basis. The inability to consider and answer each question individually, thereby learning individually from each mistake, is a serious pedagogic impediment to standard quiz books.

To overcome this problem, some workers arrange the answers to questions more or less randomly, by arranging the answers in a different numerical order which is then cross-referenced with the numerical order of the original questions. Such a system is very cumbersome, requiring a great deal of time to locate an answer, and often results in one or more "false starts" when the cross reference is forgotten or miss-remembered during a search.

Another problem encountered with known quiz books is the general inability to display questions and answers simultaneously. In standard arrangements, a quiz book user must flip back and forth between the desired question and the answer section of the book. One approach to solving this problem has been to print answers to questions in small type, place the answers in a block and print them upside down at the bottom of the page displaying the relevant questions. This approach is generally unsatisfactory because it is often easy to inadvertently discover the answer to a question not yet considered and because reading an answer often requires inversion of the text, which is awkward and time consuming.

Although stacks of quiz cards are known, they are awkward and time-consuming to use. In order to avoid inadvertent discovery of an answer, each card is generally provided with but a single question prompt on one face and an answer on the reverse face. Such devices have two significant limitations. First, as it is not possible to view the question and answer simultaneously, mental association of the question and answer is impaired. Second, such presentation of learning material is very cumbersome and inefficient in that a relatively small amount of information can be presented in any single set of cards and in that such cards are difficult to manipulate when in use.

Several workers have attempted to address these problems, but without complete success. In one device, a transparent sleeve overlying the top page of a book holds a slidable page masker that can alternately conceal and reveal the answers printed alongside the questions on the top page. When all the questions on the top page have been answered, it is removed to reveal the next one which then becomes the top page. Different embodiments of this device address the traditional limitations of quiz cards, but without permitting multiple use and easy rearrangement of information display elements.

From the foregoing, it is apparent that there is a need for improved self testing materials in which both questions and answers can be displayed simultaneously; in which the answer to a particular question cannot be discovered by mere passive inspection but can be intentionally determined with a minimum of effort.

SUMMARY OF THE INVENTION

It is an object of the invention to provide a hand-held educational device that permits the simultaneous display of test questions and answers to those questions.

It is another object of the invention to provide an educational device in which the answer to a particular test question is not immediately apparent upon inspection.

It is yet another object of the invention to provide an educational device in which an answer to a particular test question can be intentionally found with a minimum of effort.

A further object of the invention is to provide a system of arranging test material in which answers and questions are simultaneously displayed without risk that the answer to a particular question will be ascertained before the answer is desired.

In a first embodiment, the invention meets these and other objects by providing a self-help test book. The test book comprises one to many question display elements, each of which bears in a desired order printed questions directed to the particular subject under study. Each question is identified by an answer identification code having a first graphic designation and a second numeric designation. The test book is also provided with an answer display element bound rearward of the question display elements. The answer display element bears answers to the printed questions in the forward part of the book. The answers are arranged in blocks according to the graphic designation of the particular question to which the answer belongs. The answers are further organized within each block by the numeric designation of the particular question to which the answer belongs. The questions are assigned answer identification codes in a non-ordered fashion so that answers to adjacent questions end up being displaced from one another either within or between answer blocks.

According to another aspect of the invention, the answer display element is configured to expand and lie flat adjacent to the question display elements, so that both a set of questions and answers to those questions are simultaneously visible.

In another embodiment of the invention, a method of arranging question and answer material is provided. The method provides for the organization of test questions in a desired order. The questions are each assigned, in a non-ordered fashion, a two element code consisting of a graphic designation and a numeric designation. Answers to the questions are arranged in blocks according to the graphic designation of the question to which the answer belongs. Each block of answers is further arranged numerically within the block according to the numeric designation of the question to which the answer belongs.

In yet another embodiment of the invention, an educational device comprising a stackable plurality of quiz cards slidably and removably disposed within a housing is provided. The quiz cards are provided with a vertical array of question and answer pairs. The housing is provided with a window through which the uppermost quiz card in the housing can be viewed. The device is further provided with a screen that is captured and slidably disposed within said housing immediately behind the window, such that the screen can be manipulated to close off all or a portion of the window, thereby obstructing view of all or a portion of the uppermost quiz card. A user then manipulates the position of the screen to sequentially reveal first a question and then an answer, thereby quizzing himself on the material.

It will be appreciated that the present invention avoids many of the problems recurrent in the prior art. First, the educational device of the invention permits answers to questions to be arranged in such a way that the answer to a particular question is quickly ascertainable when desired, but is not discoverable by mere inspection. The invention is advantageous also in that it permits the simultaneous display of both question and answer material, minimizing the effort needed to locate the appropriate answer to a question, and allowing questions to be considered individually for whatever amount of time the student deems appropriate without the risk that the answer will be inadvertently discovered.

These and other objects and advantages of the invention will be more fully apparent upon consideration of the drawings and detailed description of the invention set forth below.

BRIEF DESCRIPTION OF THE DRAWING

FIG. 3 is a plan view of an information display element of the second embodiment of the educational device of the invention.

DETAILED DESCRIPTION OF THE INVENTION

Figure 1:
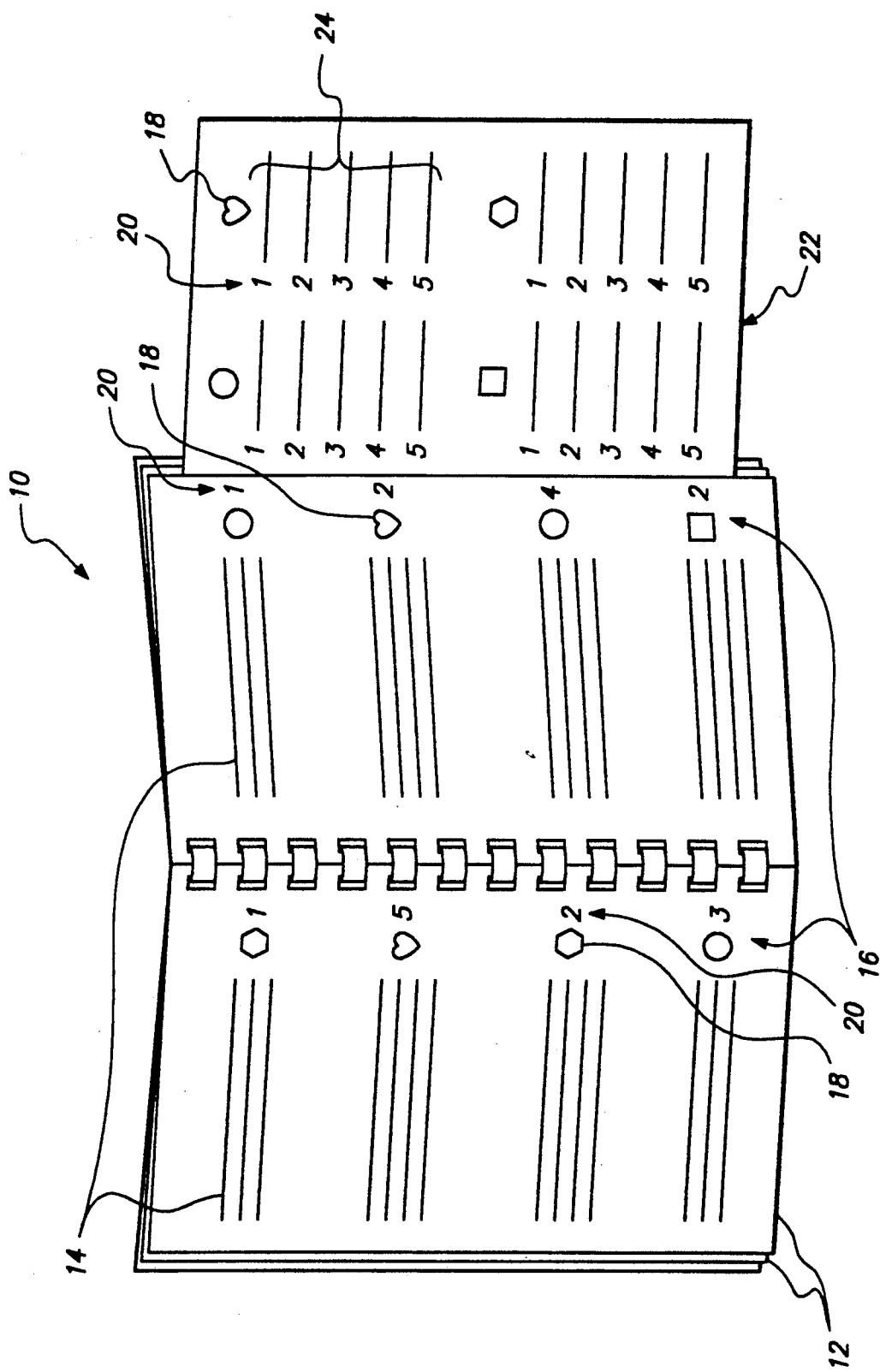
FIG. 1 is an elevated view in perspective of a first embodiment of the educational device of the invention.

Turning to FIG. 1, the educational device of the invention will now be described. Educational device 10 configured in the form of a book or similar device having bound pages that can be turned and made to lie flat. Educational device 10 includes a number of question display elements 12. Each question display element 12 bears a number of questions 14 in a desired order. Each of these questions is designated by an answer identification code 16. Answer identification code 16 acts as a cross reference to the arrangement of answers as discussed more fully below. Answer identification code 16 may consist of two or more designation elements, but is preferably composed of two distinct elements, a graphic designation element 18 and a numeric designation element 20.

Educational device 10 further includes an answer display element 22. Answer display element 25 is mounted rearward of the question display elements 12 and is configured in such a way as to be simultaneous and fully exposed with at least one question display element 12 at any particular time during use. As shown in the figure, one possible configuration is a foldably extendible element that can be unfolded and expanded during use. Alternatively, answer display element 22 could be slidably mounted in a rear panel of the educational device, allowing it to be deployed or retracted as desired.

Answer display element 22 is provided with answers to the questions provided on question display elements 12. The answers are arranged first in discrete blocks 24, each block identified by one of the graphic symbols used as a graphic designation 18 on question display element 12. Within each block, answers are arranged in numerical order, with each number corresponding to a numeric designation 20 appearing after one of the questions on question display element 12. Answer retrieval is accomplished by noting the graphic and numeric designation of the question to be answered. The student first proceeds to the block of answers bearing the graphic designation of the question, followed by identifying the answer based on the numeric designation of the question.

According to another aspect of the invention, a method of simultaneous display of test questions and answers in which an answer to a particular test question is not apparent on passive inspection but in which the answer can be intentionally located with minimal effort is provided. The method comprises the steps of arranging selected test questions on a test question display element in a desired order. Each question is designated by an answer identification code having at least two discrete elements. The answers to the selected test questions are arranged on a answer display element in discrete blocks according to one of the elements of the answer identification code. The answers are then organized within each block according to the other element of the answer identification code. The method ensures that the order of the answers on the answer display element is different from the order of questions on the question display element, thereby preventing discovery of an answer to a particular question by passive inspection. Further, the systematic arrangement of answers in at least distinct hierarchical series ensures that intentional location of an answer to a particular question can occur with minimal effort.

Figure 2A:
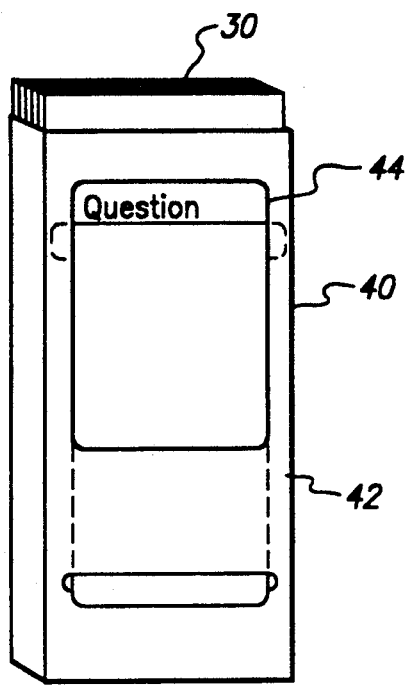
FIGS. 2 A-C are each an elevated view in perspective of a second embodiment of the educational device of the invention.
Figure 2B:
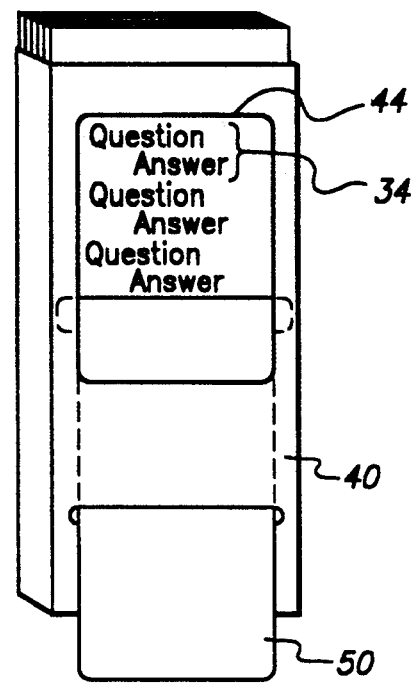
Figure 2C:
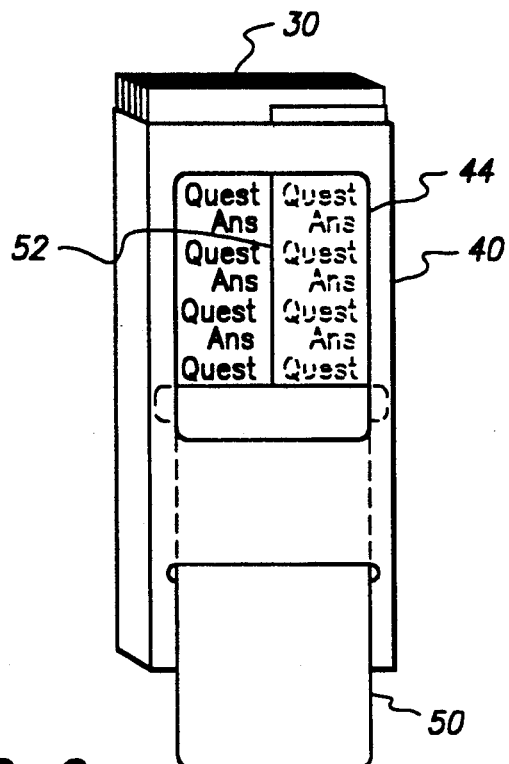

Turning now to FIG. 2, the second embodiment of the invention will now be described. A plurality of information display elements or cards 30 are provided. Each card 30 is printed with a vertical array of pairs 34 of question prompts and answers that constitute the material to be learned. The question and answer pairs 34 are generally arrayed from top to bottom in a readable orientation in a single column. However, according to another embodiment, two or more columns of question and answer pairs 34 may be provided.

Although it is preferred to provide information display elements that are pre-printed with pairs of questions and answers, it will be appreciated that according to another aspect of the invention blank information display elements can be provided. Such blank information display elements could be provided with hand-written question and answer pairs, thereby allowing the user to tailor the information content of the device to her particular need.

The invention is further provided with a housing 40 which is provided with a front face 42 and a information element or card display means, such as window 44. The cards 32 are stacked in a desired arrangement and then placed within the housing. It will be appreciated that the housing should be configured to provide for easy and slidable receipt of the cards. The housing 40 is further provided with a masking means, such as screen 50, which is disposed between the front face of the housing and the uppermost card 30 of the stack of cards 30 inserted within the housing 40. The screen 50 is also slidably disposed within the housing but, by means well known in the art, is configured to be captured within said housing, such that the screen 50 can be slid to the top of the housing in order to close of the window 44 without sliding out of the housing 40.

According to another embodiment of the invention in which the cards 30 are provided with 2 or more columns of question and answer pairs, a column masking means of column screen 52 is provided. The column screen 52 can be used to block an entire column of question and answer pairs that otherwise would be visible through the window 44.

It will be appreciated that window 44 occupies only a portion, generally about half, of the front face of housing 40. In such a case, only half of card 30 will be visible when captured within the housing 40. In such an embodiment, the card 30 may be divided into halves with the upper half provided with question and answer pairs 34 in readable orientation and the lower half provided with question and answers oriented 180 degrees opposite those arrayed above. In this way, the stack of cards can be removed inverted and reinserted into the housing 42, thereby doubling the information storage capacity of a particular deck of cards.

In operation, a user would select a desired set of cards 30, stack them in a desired order and insert them within the housing 40, in which the screen 50 has been extended as far upwards as possibly in order to completely close off window 44. Testing can begin by sliding the screen 50 downwards until a question prompt is revealed. The user then pauses to recall the correct answer and proceeds by sliding the screen 50 down further to reveal the answer. In this way, a large number of questions and answers can be reviewed without the need to manipulate the order of cards in the stack. Once all pairs of questions and answers have been exhausted on a particular card, the card can be removed and reinserted at the back of the stack to reveal the card underneath.

By now it will be appreciated that the devices and methods of the present invention are advantageous over the prior art. First, the invention permits the simultaneous display of both questions and their answers without the risk that the answer to a particular question will be inadvertently discovered. Further, according to one embodiment, the invention provides a systematic way of scrambling the order of answers relative to questions and yet ensure that the correct answer can be matched to a particular question with a minimum of effort. According to another embodiment, the invention provides a means of very rapid questioning, without the awkward need to frequently manipulate and rearrangement information display elements.

Although the invention has been described with respect to certain embodiments and examples, it will be understood to one skilled in the art that certain modifications to these embodiments can be made without departing from the invention, the scope of which is defined by the claims set forth below.

I claim:

1. A hand-held educational device for selfhelp testing of knowledge on a particular subject, said educational device comprising:
   a) a housing having a front face;
   b) a plurality of stackable information display elements slidably disposed and rearrangeable within said housing, said elements provided with vertically arrayed pairs of questions and answers directed to the particular subject and organized into a stack such that only an uppermost information display element is visible at a given time;
   c) display means disposed on the front face of said housing through which the vertically arrayed pairs of questions and answers may be viewed; and
   d) masking means for concealing a portion of the vertical array of pairs of questions and answers, said masking means vertically slidably secured within said housing and disposed between the front face of said housing and the uppermost information display element, wherein a user sequentially manipulates said masking means to reveal first the question and then the answer of each of said vertically arrayed pairs of questions and answers in order to self-test knowledge on a particular subject and wherein the questions and answers are arranged vertically.

2. The educational device of claim 1 wherein the vertically arrayed pairs of questions and answers are displayed on said information display elements in two or more vertical columns, said device further provided with a column masking means slidably disposed within said housing wherein said column masking means is slid laterally within said housing to mask all but a single column of question and answer pairs.

3. The educational device of claim 1 wherein said display means is configured to permit viewing of only a portion of said uppermost information display element, said information display element further characterized in being provided with a first vertical array of pairs of questions and answers in readable orientation and visible through said display means and a second array of pairs of questions and answers in an orientation 180 degrees opposite that the first array, said second array masked by the front face of said housing.

4. The device of claim 3 wherein said information display element has a front side and a backside, each of which is provided with vertically oriented arrays of pairs of questions and answers.

* * * * *